United States Patent
Averbuch et al.

(10) Patent No.: US 6,279,363 B1
(45) Date of Patent: Aug. 28, 2001

(54) METHOD AND DEVICE FOR CONTROLLING THE DEFORMATION OF AN UNCOILED METAL PIPE

(75) Inventors: Daniel Averbuch, Rueil-Malmaison; Gilles Perrin, Chatillon, both of (FR)

(73) Assignee: Institut Francais du Petrole, Rueil-Malmaison cedex (FR)

( * ) Notice: Subject to any disclaimer, the term of this patent is extended or adjusted under 35 U.S.C. 154(b) by 0 days.

(21) Appl. No.: 09/526,204

(22) Filed: Mar. 15, 2000

(30) Foreign Application Priority Data

Mar. 15, 1999 (FR) ................................................ 99 03194

(51) Int. Cl.$^7$ ....................................................... B21D 3/02
(52) U.S. Cl. ................. 72/8.3; 72/11.1; 72/164; 72/183
(58) Field of Search .............................. 72/8.3, 7.4, 11.1, 72/11.2, 160, 164, 183; 405/168.3

(56) References Cited

U.S. PATENT DOCUMENTS

| 4,345,855 | 8/1982 | Uyeda | 405/168 |
|---|---|---|---|
| 4,457,149 | * 7/1984 | Weinzinger | 72/161 |
| 4,571,821 | 2/1986 | Pirl | 72/164 |
| 4,776,221 | 10/1988 | Friis | 73/862.45 |
| 5,527,134 | 6/1996 | Recalde | 405/168.3 |
| 5,676,009 | * 10/1997 | Bright | 72/164 |
| 5,687,595 | * 11/1997 | Noe | 72/8.3 |
| 5,964,114 | * 10/1999 | Noe | 72/11.7 |
| 6,029,485 | * 2/2000 | Bohmer | 72/8.3 |

FOREIGN PATENT DOCUMENTS

| 4003258 | 8/1991 | (DE) . |
|---|---|---|
| 19503850 | 6/1996 | (DE) . |
| 2299286 | 10/1996 | (GB) . |
| 9608605 | 3/1996 | (WO) . |

* cited by examiner

Primary Examiner—Daniel C. Crane
(74) Attorney, Agent, or Firm—Antonelli, Terry, Stout & Kraus, LLP

(57) ABSTRACT

The present invention relate to a device and to a method for handling a pipe (1) comprising at least one metal tube plastically wound on a drum (2). The invention comprises an adjustable straightening system (5) controlled by at least one series of means (6, 7) for measuring the stresses present in the material of the tube once unwound from the drum. The present invention can be used for floating supports intended for offshore laying of uncoiled rigid tubes or for units referred to as "coiled tubing" used in oil wells for drilling or well servicing.

14 Claims, 5 Drawing Sheets

US 6,279,363 B1

METHOD AND DEVICE FOR CONTROLLING THE DEFORMATION OF AN UNCOILED METAL PIPE

FIELD OF THE INVENTION

The present invention relates to a method and to a device for controlling deformations of a metal tube by measuring the stresses internal to the metallic material of the tube. The sphere of application of the invention is preferably the offshore petroleum industry using effluent transportation metal pipes that have been wound on large drums, carried, then unwound in order to be laid on the sea bottom, or suspended, by laying boats equipped with specific handling means, notably of the traction caterpillar type.

Coiled metal tubes referred to as coiled tubings are also used in another sphere such as drilling or operations in a production well. These tubes, whose diametric dimension ranges between 1" (25.4 mm) and 4" (101.6 mm), are also wound on a drum that is 2 to 3 m in diameter. They are used to be lowered into the well in order to carry out drilling, gas or liquid injection, cleaning, measuring operations, etc.

In these techniques, the tubes are wound under plastic deformation because the radii of curvature of the drums generate great flexural stresses in relation to the yield limit of the materials used.

When the tubes are unwound to be either laid on the sea bottom or suspended, or displaced in a well, the material can therefore keep an appreciable level of residual stresses. The handling means, such as traction caterpillars, generally include a tube straightening device consisting of a series of at least three rollers (or equivalent) that applies a flexural stress contrary to the remanent curvature of the tube once unwound, generally in a single plane.

It has been observed that the tubes once unwound generally have too great internal stresses that often generate bothersome geometric deformations that can even be harmful during operation.

SUMMARY OF THE INVENTION

The present invention thus relates to a method for handling a coiled tube comprising at least a metal casing plastically deformed through winding on a cylindrical drum, the tube once unwound being fed into a straightening system. According to the method, at least the following operations are carried out:

the stresses are measured in the tube once unwound,
said straightening system is controlled according to said stress measurements so as to obtain, at the straightener outlet, determined stress distribution and level in the metallic wall of said tube.

The stresses can be measured downstream and/or upstream from the straightener.

A stress distribution can be imposed in the tube so that the tube has a determined curvature after passage through the straightener.

The stresses can be measured susbtantially along all of the tube circumference.

A stress field can be imposed in the tube so as to optimize its compressive buckling limit in a well.

A bending moment can be calculated in at least one orthogonal direction to the axis of the tube, from stress measurements in said tube.

The invention also relates to a straightening device for handling a coiled tube comprising at least one metal casing plastically deformed through winding on a cylindrical drum, the tube once unwound being fed into said straightening system. The device comprises at least:

means for measuring the stresses in the tube once unwound,
straightening adjustment means,
means for controlling the adjustment of said straightening device according to said stress measurements so as to obtain, at the straightener outlet, determined stress distribution and level in the metallic wall of said tube.

The stress measuring means can be placed upstream from the straightening adjustment means.

Measuring mans can be placed downstream from the straightening adjustment means.

The two supporting and centering devices, placed at a given distance from one another, can hold up the tube and a series of jacks placed between said supporting devices can be controlled to deform the tube resting on both devices according to the desired stress field.

At least four jacks arranged opposite each other two by two and in two orthogonal directions can constitute the controlled straightening means.

At least three jacks arranged at 120 degrees around the tube can constitute the controlled straightening means.

The measuring means can comprise a series of stationary pickups distributed around the circumference of the tube.

The measuring means can comprise at least one pickup mounted on a device rotating around the tube.

BRIEF DESCRIPTION OF THE DRAWINGS

Other features and advantages of the present invention will be clear from reading the description hereafter, given by way of non limitative example, with reference to the accompanying drawings wherein.

DETAILED DESCRIPTION OF THE INVENTION

The method according to the invention requires a technique for measuring stresses in the section of a metal tube. Documents U.S. Pat. Nos. 5,016,200; 5,170,366 or 5,503,020 for example describe the following measuring principle : the variations of the propagation velocity are measured in several directions for an acoustic wave emitted by one or more pickups, the velocity being directly proportional to the state of stress in the various directions. This EMAT™ (ElectroMagnetic Acoustic Transducers) and ASG™ (Jauge Acoustique de Déformation™) technique was developped by the SonicForce™ company. The general principle thus consists in generating ultrasonic waves in a material by using EMAT™ Electromagnetic Acoustic transducers, then in measurements performed by means of the ASG acoustic strain gages. This measuring method is without contact and it is based on the variation of the "flight time" of the ultrasonic waves created by the EMAT™ generators. This system allows to perform 3000 measurements per second and it can be used in difficult environments, including high vibrations. This non limitative technology is well-suited for implementing the present invention. Of course, the measuring means can be modified and optimized for specific products such as uncoiled rigid tubes.

The stress measuring means allow to obtain an average, in the thickness of the rigid tube, of the stresses along the axis z of the tube $\sigma_z(\theta)$ as a function of the azimuth angle $\theta$. These stresses will be modified by the successive flexions undergone by the tube. The measuring means can comprise several pickups distributed on the circumference of the tube, or a device rotating around the tube, thus allowing to measure the stresses on all of the circumference.

This knowledge of the stresses allows to calculate the bending moments to which the tube is subjected by integration in the section of the following formulas:

$$Mx = R^2 . t \int_0^{2\pi} \sigma_z(\theta) . \sin \theta . d\theta$$

$$My = R^2 . t \int_0^{2\pi} \sigma_z(\theta) . \cos \theta . d\theta$$

with R the radius of the tube and t the thickness of the tube wall. Axes x and y form an orthogonal reference system in the plane perpendicular to axis z of the tube.

Figure 1:
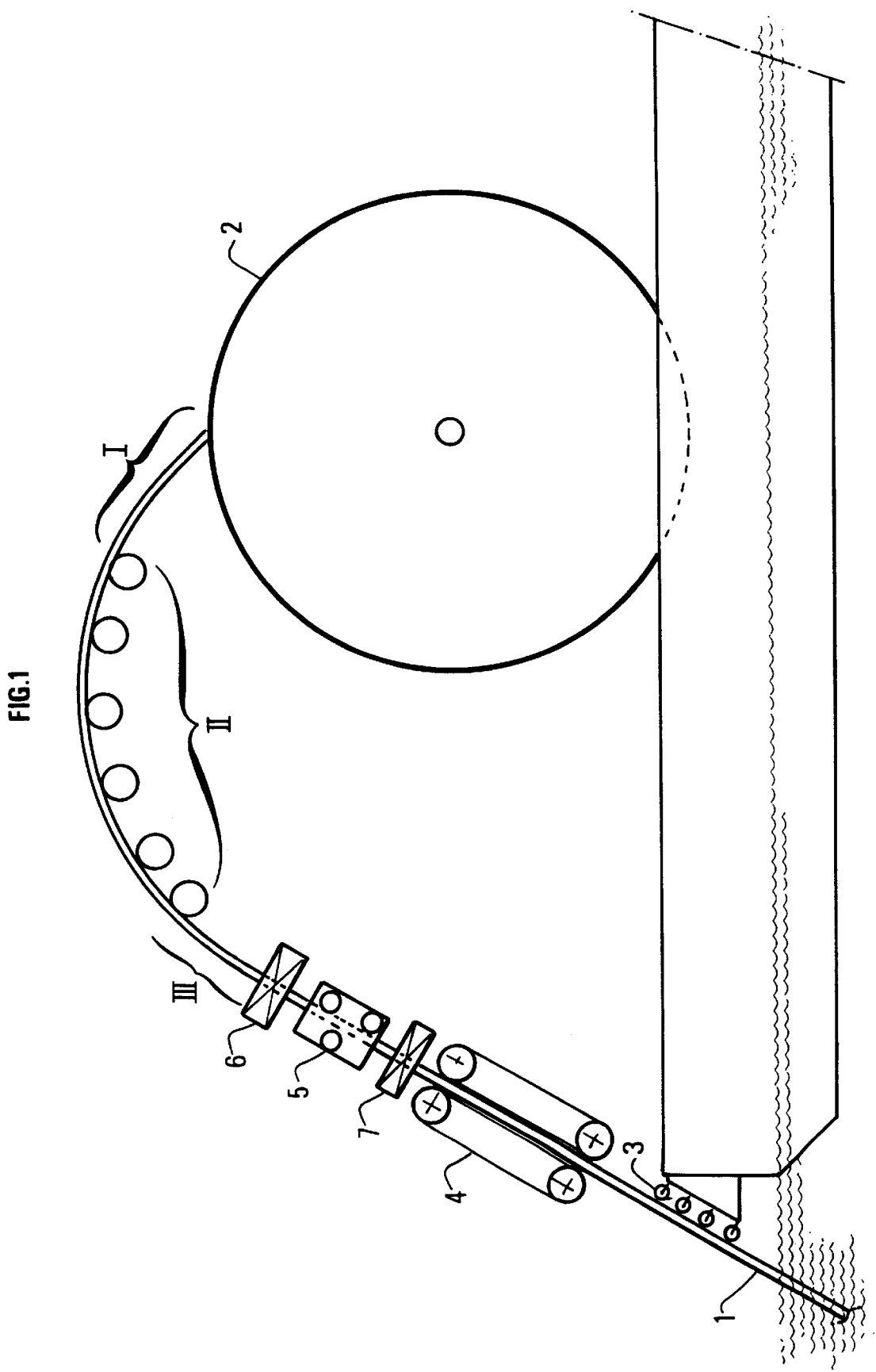
FIG. 1 diagrammatically shows the device according to the invention used for offshore laying of rigid pipes, FIG. 2 diagrammatically shows an example of configuration of an offshore pipe, FIG. 3 diagrammatically shows the device according to the invention applied to a coiled tubing.

FIG. 1 diagrammatically shows a barge intended for offshore laying of a rigid pipe 1 wound on a drum 2. According to the known coiled rigid tubing technique, storage on the drum of the required pipe length, after sections welding, is performed onshore in suitable plants. The floating support thereafter moves towards the laying point where tube 1 is unwound from drum 2 so as to constitute, for example, at the sea bottom, a flow line for an effluent between a subsea wellhead and a storage site, or a riser for carrying the effluent up to the surface. A stinger 3 supports the tube just before it runs through the water depth. This support is generally placed at the back of the floating support. For safe handling of tube 1, whether when lowering it or when taking it up, a device 4 referred to as tensioning device is used, which comprises a pair of caterpillars pressed against the tube and longitudinally driven by motors. When the tube is lowered, considering its weight, it is held back by the tensioner. Tube 1 being wound under plastic deformation on drum 2, as it is unwound, it is again plasticized: along zone I (where the tube is substantially rectilinear); along zone II (where it is curved again); along zone III (where it is rectilinear again). However, it is clear that a certain field of residual stresses remains in the material. Therefore, and in order to allow best passage of the tube in the tensioners, the tube is straightened upstream from the tensioners by using a straightening system 5. According to the present invention, means for measuring the stress field are furthermore arranged upstream from straightener 5. The straightening system is specific here insofar as it comprises mechanical straightening means that can be pilot-operated by a control. Control is mainly performed from stress field measuring means 6. In a variant of the control system, a second stress measuring device 7 can be added to the assembly downstream from the straightener, but upstream from the tensioners. This second measuring point allows to complete the control system by forming a regulation loop.

According to the present invention, the straightness of the tube can thus be controlled at the straightener outlet. In fact, for the tube to remain substantially straight, the internal bending moments must be practically zero at the straightener outlet. If this is not the case, the tube will tend to bend and the bending moments will be zero.

Figure 2:
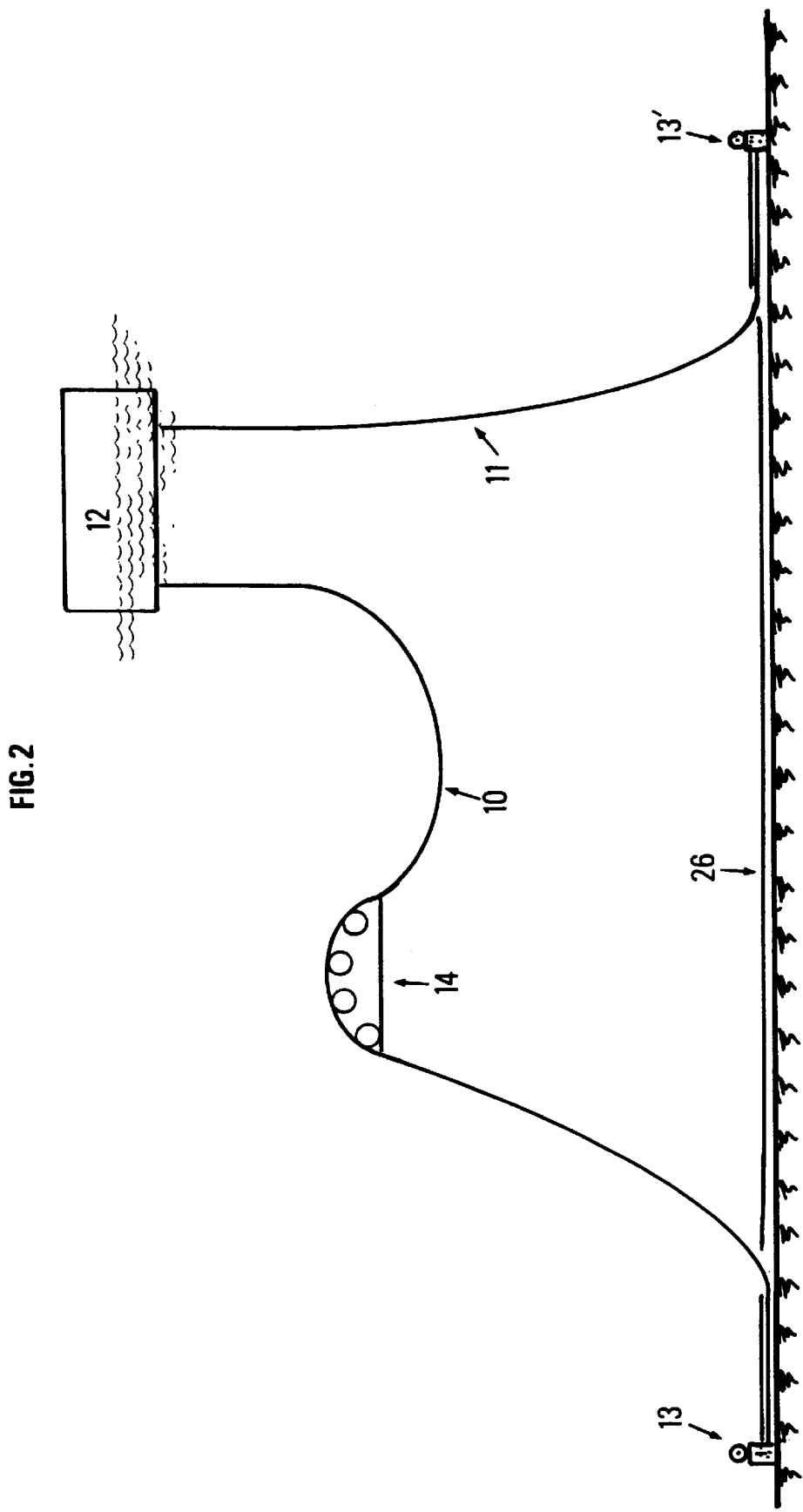

In another application, a configuration can be imposed on the tube by determined elasto-plastic preforming of the pipe. This operation could allow to select rigid tubes for certain pipe configurations in the offshore petroleum industry conventionally reserved for flexible pipes. FIG. 2 illustrates an example of such configurations. Other offshore configuration examples can be seen on page 38 of "Applications of Subsea Systems" by Goodfellow Associates Ltd., published by Penn Well Publishing Company (Tulsa), a book mentioned here by way of reference.

FIG. 2 shows a pipe 10 substantially of a configuration referred to as "Lazy Wave". Pipe 10 is connected, at the sea bottom, to a wellhead, or a manifold 13, and, at the surface, to a floating support 12. A series of floats 14 gives an arch-shaped curvature at the subsurface. This configuration imposes curvatures on the pipe. When rigid pipes are used, it can be advantageous to preform these pipes with curvatures suited to said configuration. Pipe 11 is suspended according to a catenary configuration from another wellhead 13'. Preforming the tube can also be advantageous with this configuration. Pipe 26 is a flow line, i.e. a pipe laid on the sea bottom between two wellheads 13 and 13'. This pipe undergoes no tension except the tension due to the bottom effect created by the internal pressure.

Figure 3:
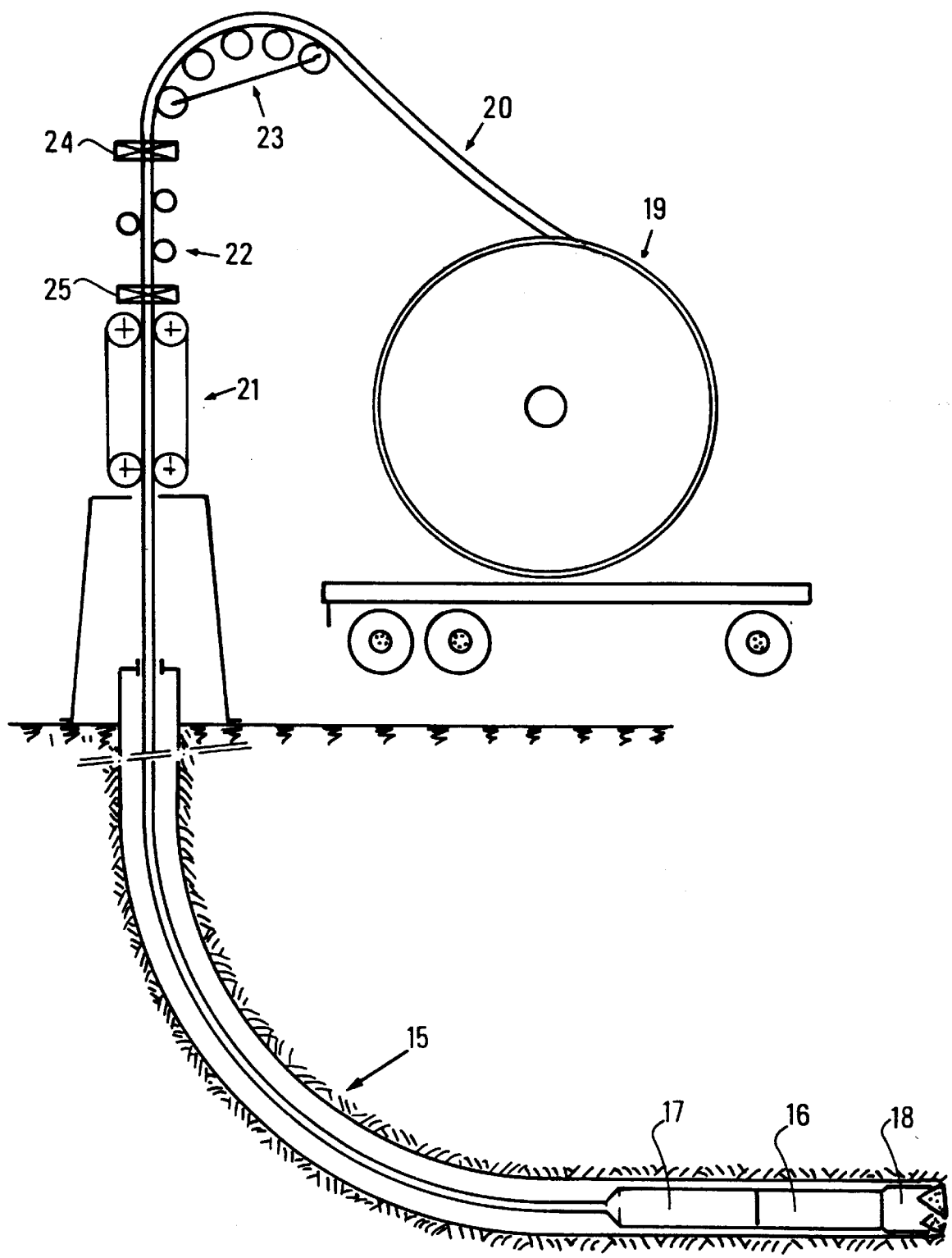

FIG. 3 illustrates another application of the method according to the invention in the sphere of drilling or of oilwell production. A well 15 is drilled by means of a bottomhole assembly 16 comprising a downhole motor 17 and a drill bit 18. The bottomhole assembly is driven in well 15 by a continuous steel tube 20 referred to as coiled tubing in the trade. It is a metal tube stored on a drum 19 about 2 to 3 meters in diameter. A vertical caterpillar system 21 referred to as injector moves the coiled tubing in the well. According to the present invention, a straightening device 22, generally provided with rollers, is placed upstream from the injector and downstream from gooseneck 23. Means 24 for measuring the stresses in the tube control the straightening operation. Other measuring means 25 can also be placed downstream from the straightening point for stress measurement after straightening of the tube.

Figure 4:
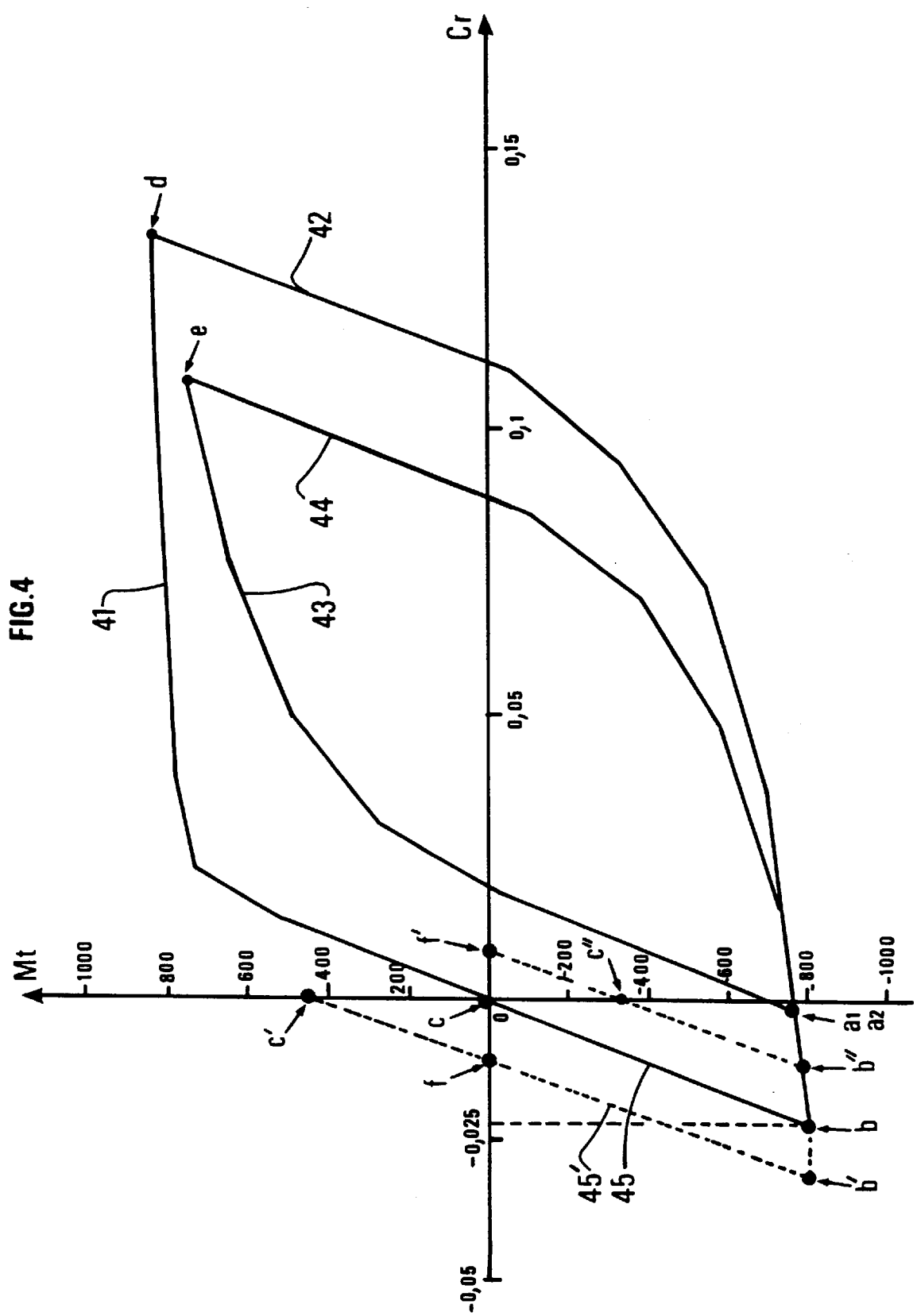
FIG. 4 is a graph of the bending moment function for a tube during winding/unwinding operations.

The principle of straightening consists in obtaining zero bending moments when the tube is straight, i.e. at the straightener outlet. Measuring the bending moments thus allows to control the straightener so as to obtain this state. FIG. 4 thus shows the evolution of the bending moment Mt (laid off as ordinate and in kN.m) as a function of the curvature Cr (laid off as abscissa and in $m^{-1}$) during stages of winding/unwinding in a plane. Knowing the behaviour of the materials, it is possible to determine as follows the bending moment during winding/unwinding up to point a2 where the curvature is zero, at the straightener inlet.

Point of origin c represents the welded rectilinear tube before winding on the drum. Curve 41 represents, from c to d, winding of the tube on the drum. Curve 42, between d and a1, represents the tube unwinding operation and the rectilinear straightening thereof along zone I (FIG. 1). It can be noted that, at point a1, the curvature is zero but moment Mt is great. Curve 43, between a1 and e, represents the curvature applied to the tube in zone II (FIG. 1). From point e, curve 44 represents the return to straightness of the tube in zone III (FIG. 1) upstream from straightener 5. The moment at a2 (of the order of 800 kN.m here) can be measured by means of stress pickups 6 (FIG. 1). In the present case, points a1 and a2 are superposed, which is not the case in general. Point b represents the action of active straightener 5 which deforms the tube with an opposite curvature (in this example, of the order of 0.025, i.e. about a 40-m radius). The object of the straightener adjustment is to cause stress relaxation curve 45 to arrive at origin c where the tube is theoretically rectilinear and stable (zero moment and zero curvature).

Point b' represents another adjustment of controlled straightener 5 through which relaxation curve 45' leads to a zero bending moment for a 0.01 $m^{-1}$ curvature (point f), or to a rectilinear state with a bending moment of 450 kN.m (point c'). This example clearly shows the action of the controlled straightener which allows to adjust the state of stress in the material of the tube.

Another adjustment b" shows that a residual curvature can be obtained in the opposite direction (point f), or another stress field.

It can be seen in FIG. 4 that the measurement of the bending moment Mt after the straightener is a good indicator of the straightness of the tube, because this quantity varies notably for low curvature variations.

The principle of straightening thus consists in controlling the amplitude of the counter-bending induced by the straightener (position of point b, b' or b") by the value of the bending moment at points a2, c, c' or c".

The invention can consist in straightening the tube in at least two directions. Since measurement of the stresses allows to calculate the bending moments around two axes of the plane, it is possible to have either two orthogonal-action straighteners in series or one specific straightener whose controlled deformation means allow straightening in several directions.

Figure 5:
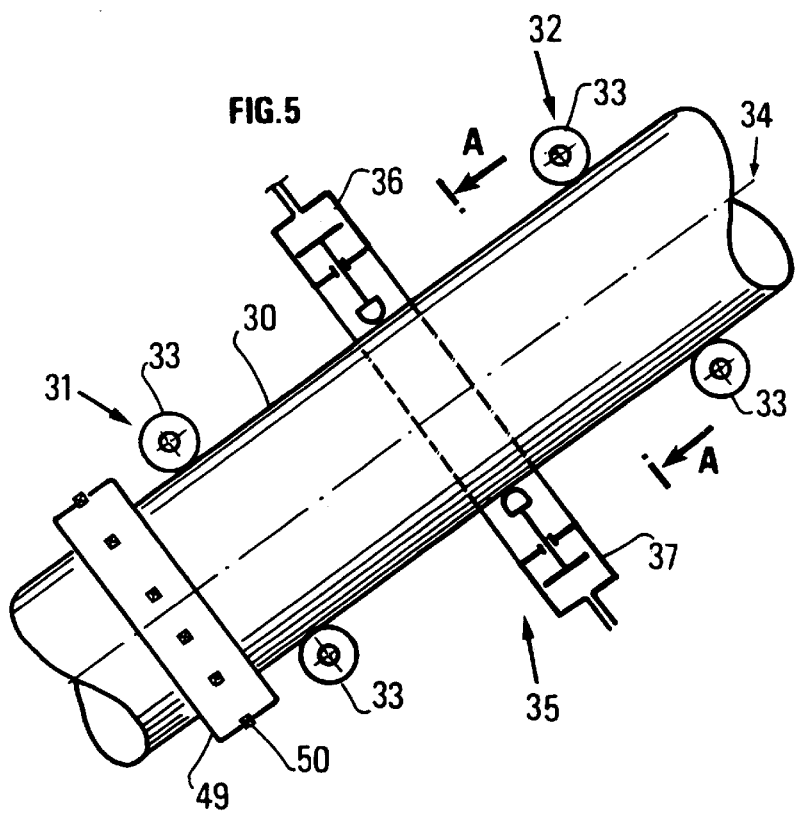
FIGS. 5, 5a and 5b show the flowsheet of a straightener according to the invention.

FIG. 5 diagrammatically shows the principle of such a straightener. Uncoiled tube 30 passes through the straightening device comprising two supporting zones 31 and 32 consisting, for example, of rollers 33, which keep the sections of the tube centered on axis 34 in zones 31 and 32. There can be only two opposite rollers in the case of one-directional straightening means, or a series of rollers distributed around the circumference of the tube in the case of multi-directional straightening means. Deformation and straightening means 35 are placed between the two centering zones 31 and 32. These means are here rollers mounted on hydraulic jacks 36 and 37. According to a control adjusting displacement of the jack rods, a lateral pressure is exerted on the tube to obtain the desired deformation, considering the stresses measured upstream. The regulation mode of such a displacement is known in the trade and will not be detailed here. In general, a displacement pickup on the rod of the jacks controls a hydraulic power generation unit and fluid delivery to said jacks. Thus, according to a measured stress level, the bending and the direction to be applied to tube 30 are determined. Bending depends on the displacement of a jack in the determined direction. Control consists, in this example, in sending a regulation order to the hydraulic unit to obtain fixed displacement of one or of the two jacks 36, 37. The support can also include caterpillar systems that advantageously provide longer support. The same can apply to the straightening means.

Reference number 49 illustrates the measuring means consisting of pickups 50 mounted, for example, on a ring. The ring can be stationary in relation to the tube, i.e. in this case it does not rotate. In this case, measurement of the stresses around the circumference of the tube is performed by a series of pickups evenly distributed on the ring. The ring can also be rotating, i.e. the pickup(s) are driven in rotation around the tube so as to achieve circumferential measurements. If the acquisition frequency of the pickups is not sufficient to allow measurement as the tube moves, the ring can furthermore be translated in order to be relatively motionless in relation to the tube during measurement.

Figure 5A:
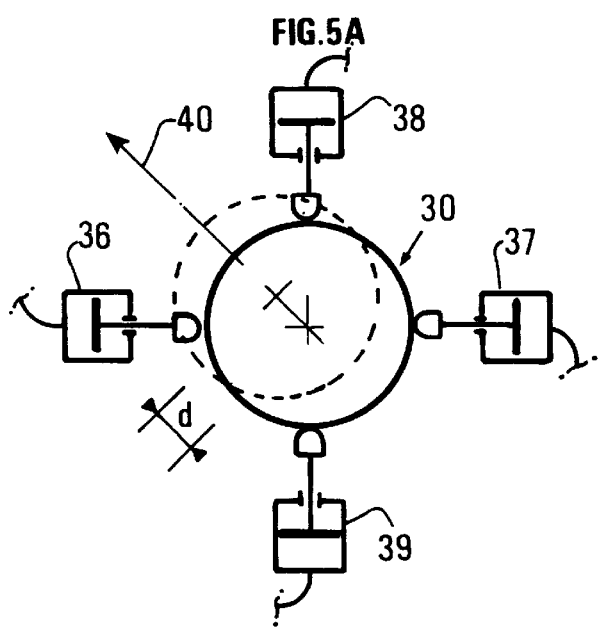

FIG. 5a shows, in axial view, an example of straightening means comprising two series of opposite and orthogonal jacks: 36, 37 and 38, 39. FIG 5a diagrammatically illustrates the possibility of flexurally deforming the tube in all directions. By means of a more complex regulation of the four jacks, it is possible to bend the tube in direction corresponding to displacement d. Delivery of the hydraulic fluid must then be achieved according to different orders for each jack. This technique therefore requires a more complex calculation and control program.

Figure 5B:
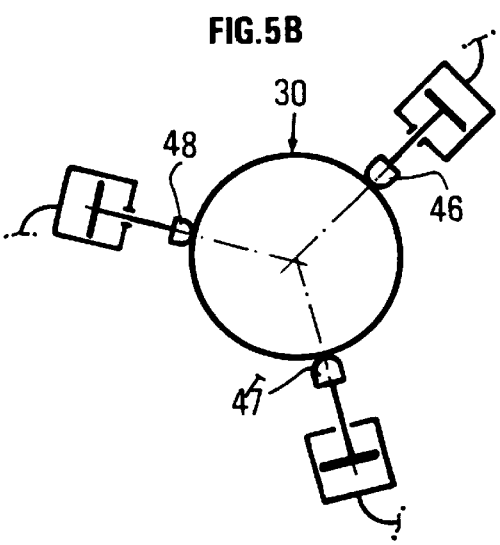

FIG. 5b represents a variant of the device with three rollers 46, 47 and 48. The straightening and control principle is similar to that of FIG. 5a.

The invention is not limited to this type of straightener. There are other mechanical means allowing flexural deformation of a tube, for example by using electrically or mechanically controlled jackscrews.

What is claimed is:

1. A method for handling a coiled tube (1) comprising at least a metal casing plastically deformed through winding on a cylindrical drum (2), said tube once uncoiled being fed into a straightening system (5), characterized in that at least the following operations are carried out:

measuring stresses in the tube once uncoiled, controlling said straightening system (5) according to said stress measurements so as to obtain, at the straightener outlet, determined stress distribution and level in the metallic wall of said tube.

2. A method as claimed in claim 1, wherein stresses are measured downstream and/or upstream from the straightener.

3. A method as claimed in claim 1, wherein a stress distribution is imposed in the tube so that said tube has a determined curvature after passing through the straightener.

4. A method as claimed in claim 1, wherein stresses are measured substantially along all of the circumference of the tube.

5. A method as claimed in claim 1, wherein a stress field is imposed in the tube so as to optimize a compressive buckling limit thereof in a well.

6. A method as claimed in claim 1, wherein a bending moment is calculated in at least one orthogonal direction to the axis of the tube, from the stress measurements in said tube.

7. A straightening device for handling a coiled tube (1) comprising at least a metallic casing plastically deformed through winding on a cylindrical drum (2), said tube once uncoiled being fed into a straightening system (5), characterized in that it comprises at least:

means (6, 7) for measuring stresses in the tube once uncoiled, straightening adjustment means, means for controlling adjustment of said straightening device according to said stress measurements so as to obtain, at the straightener outlet, determined stress distribution and level in the metallic wall of said tube.

8. A device as claimed in claim 7, wherein stress measuring means (6) are arranged upstream from the straightening adjustment means.

9. A device as claimed in any one of claim 7, wherein measuring means (7) are arranged downstream from the straightening adjustment means.

10. A device as claimed in claim 7, wherein two supporting and centering devices (31, 32), placed at a determined distance from one another, hold up said tube and wherein a series of jacks (35) placed between said supporting devices is controlled to deform the tube resting on said two devices according to the desired stress field.

11. A device as claimed in claim 10, wherein at least four jacks (36, 37, 38, 39) arranged opposite each other two by two and in two orthogonal directions constitute the controlled straightening means.

12. A device as claimed in claim 10, wherein at least three jacks (46, 47, 48) arranged at 120 degrees around the tube constitute the controlled straightening means.

13. A device as claimed in claim 7, wherein said measuring means comprise a series of stationary pickups (50) distributed around the circumference of the tube.

14. A device as claimed in claim 7, wherein said measuring means comprise at least one pickup mounted on a device (49) rotating around the tube.

* * * * *